US009861926B2

(12) United States Patent
Lebon et al.

(10) Patent No.: US 9,861,926 B2
(45) Date of Patent: Jan. 9, 2018

(54) CANISTER FOR CONTAINING AN ACTIVE MATERIAL

(75) Inventors: Jacquy Lebon, Challans (FR); Valere Logel, Levallois Perret (FR)

(73) Assignee: CLARIANT HEALTHCARE PACKAGING (FRANCE) S.A.S., Choisy le Roi (FR)

( * ) Notice: Subject to any disclaimer, the term of this patent is extended or adjusted under 35 U.S.C. 154(b) by 169 days.

(21) Appl. No.: 14/427,663

(22) PCT Filed: Sep. 12, 2012

(86) PCT No.: PCT/IB2012/002226
§ 371 (c)(1),
(2), (4) Date: Jun. 23, 2015

(87) PCT Pub. No.: WO2014/041391
PCT Pub. Date: Mar. 20, 2014

(65) Prior Publication Data
US 2015/0321142 A1    Nov. 12, 2015

(51) Int. Cl.
*B01D 53/26* (2006.01)
*B01D 53/04* (2006.01)
(Continued)

(52) U.S. Cl.
CPC ..... *B01D 53/0415* (2013.01); *B01D 53/0407* (2013.01); *B01D 53/261* (2013.01);
(Continued)

(58) Field of Classification Search
CPC ............ B01D 53/0415; B01D 53/0407; B01D 53/261; B65D 1/16; B65D 1/42;
(Continued)

(56) References Cited

U.S. PATENT DOCUMENTS

| 4,772,300 A | * | 9/1988 | Cullen | ............... B01D 53/0415 |
| | | | | 206/0.7 |
| 5,759,241 A | | 6/1998 | Klett et al. | |
| 5,824,140 A | | 10/1998 | Berger | |
| 6,146,449 A | * | 11/2000 | Lee | ..................... B01D 46/0001 |
| | | | | 128/206.17 |

(Continued)

FOREIGN PATENT DOCUMENTS

EP    0656298 A1    6/1995

OTHER PUBLICATIONS

International Search Report and accompanying Written Opinion, dated Jul. 15, 2013, with respect to International Application No. PCT/IB2012/002226.

*Primary Examiner* — Anthony Stashick
*Assistant Examiner* — James Way
(74) *Attorney, Agent, or Firm* — Scott R. Cox

(57) ABSTRACT

A canister including a canister body containing a bottom wall and at least one sidewall with inner and outer sidewall surfaces and an upper rim, and a closing element containing a top wall with an outer surface and an inner surface, and a fixing portion surrounding the top wall. The top wall or the bottom wall or at least one sidewall include a membrane region with a predetermined permeability. The fixing portion includes an elevated or recessed snap portion around its outer periphery shaped to correspond to the inner sidewall surface of the sidewall of the cylindrical canister body and form a snap connection with the canister body. The closing element is fixed to the canister body such that the outer surface of the top wall does not extend beyond the upper rim of the sidewall of the canister body.

18 Claims, 7 Drawing Sheets

(51) Int. Cl.
*B65D 1/16* (2006.01)
*B65D 1/42* (2006.01)
*B65D 43/02* (2006.01)
*B65D 81/26* (2006.01)
*B65D 41/34* (2006.01)
*B65D 41/48* (2006.01)
*B65D 51/24* (2006.01)
*B65D 51/26* (2006.01)
*B65D 51/30* (2006.01)

(52) U.S. Cl.
CPC ............. *B65D 1/16* (2013.01); *B65D 1/42* (2013.01); *B65D 41/3447* (2013.01); *B65D 41/48* (2013.01); *B65D 43/0204* (2013.01); *B65D 51/244* (2013.01); *B65D 51/26* (2013.01); *B65D 51/30* (2013.01); *B65D 81/266* (2013.01); *B65D 81/268* (2013.01); *B01D 2257/104* (2013.01); *B01D 2257/80* (2013.01)

(58) Field of Classification Search
CPC ............ B65D 41/3447; B65D 41/48; B65D 43/0204; B65D 51/244; B65D 51/26; B65D 51/30; B65D 81/266; B65D 81/268
See application file for complete search history.

(56) References Cited

U.S. PATENT DOCUMENTS

| | | | |
|---|---|---|---|
| 8,800,809 B2 | 8/2014 | Fortier | |
| 2003/0079610 A1* | 5/2003 | Hayes | B01D 53/0415 96/135 |
| 2003/0205140 A1* | 11/2003 | Flaugher | B01D 53/0415 96/119 |
| 2005/0056151 A1* | 3/2005 | Hurley | B01D 53/261 96/108 |
| 2005/0172814 A1* | 8/2005 | Brunk | B01D 53/0415 96/108 |
| 2005/0198993 A1 | 9/2005 | Corrigan | |
| 2008/0047702 A1* | 2/2008 | Neff | A24F 25/02 165/222 |
| 2009/0038327 A1* | 2/2009 | Amesoeder | B01D 53/0407 62/271 |
| 2010/0044252 A1* | 2/2010 | Portier | B65D 47/0838 206/204 |
| 2011/0139670 A1* | 6/2011 | Ciaramitaro | B65D 47/0804 206/524.1 |
| 2011/0265645 A1 | 11/2011 | Collins | |
| 2012/0171333 A1 | 7/2012 | Crump et al. | |
| 2016/0031627 A1* | 2/2016 | Yeh | B65D 81/266 206/204 |
| 2016/0114945 A1* | 4/2016 | Carsello | B65D 47/12 222/152 |

* cited by examiner

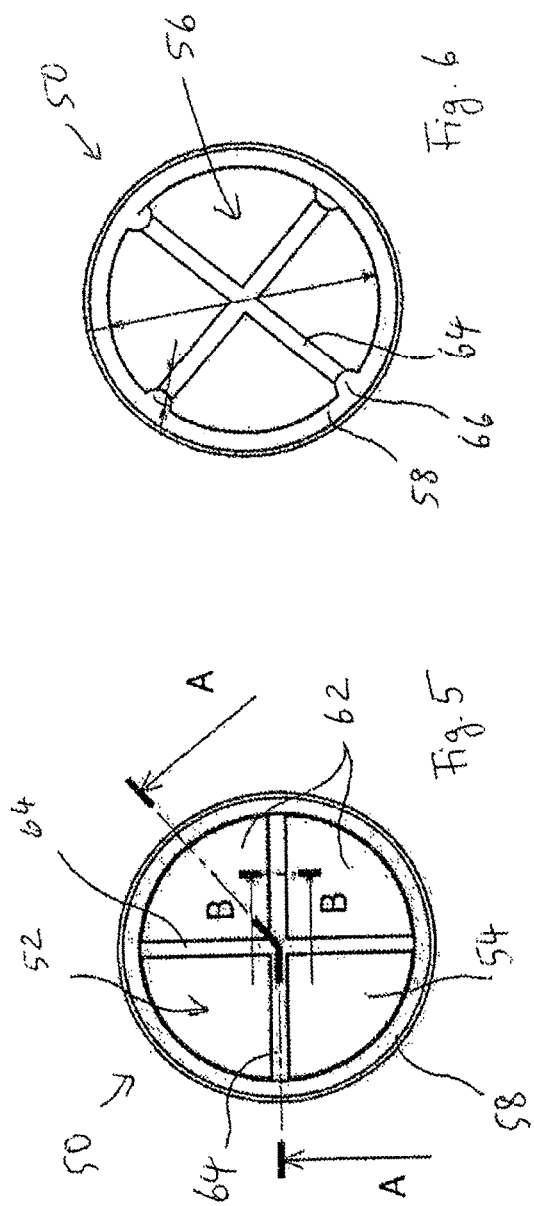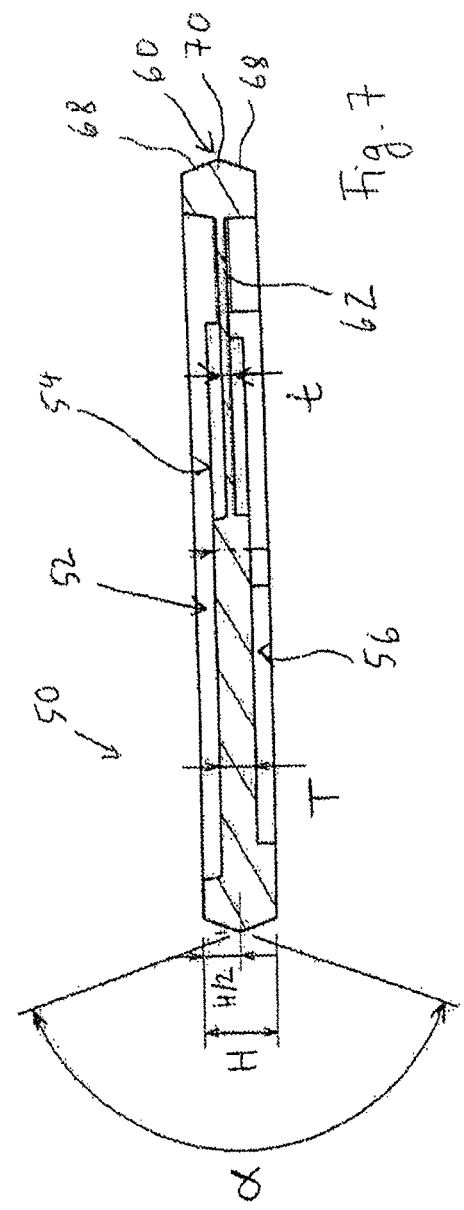

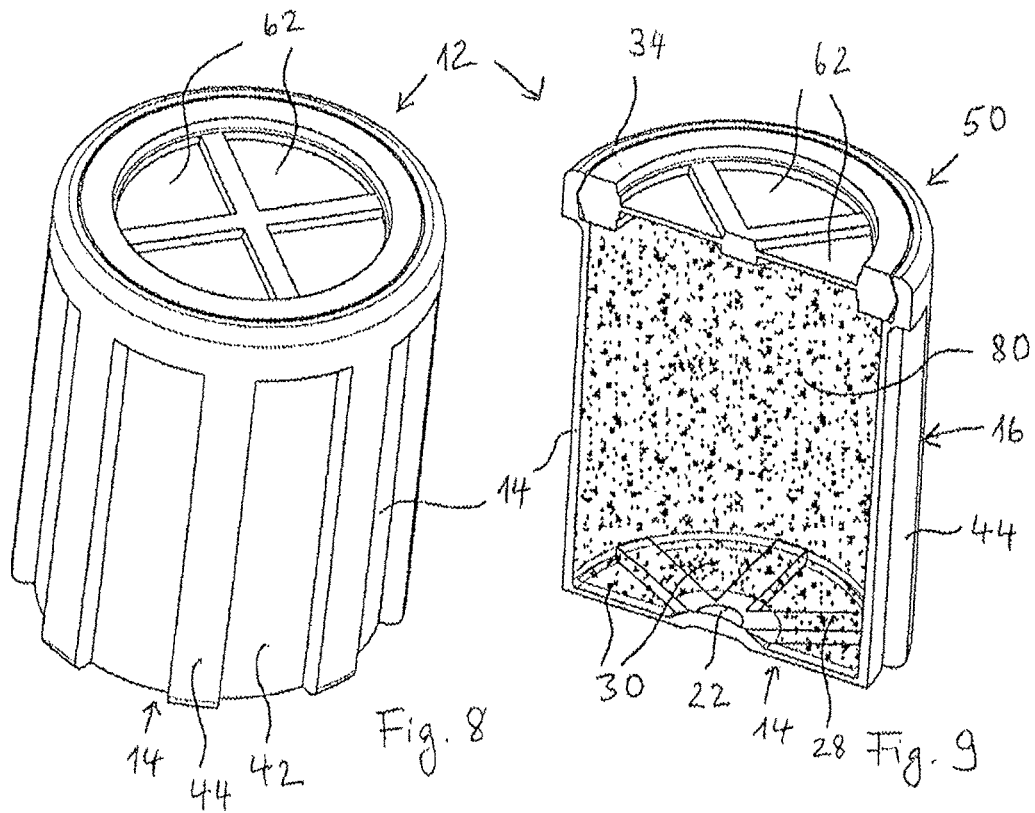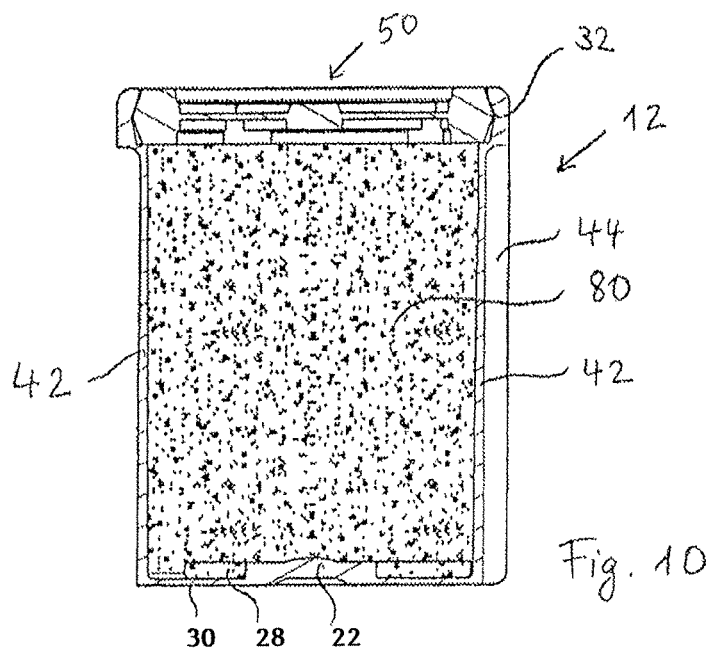

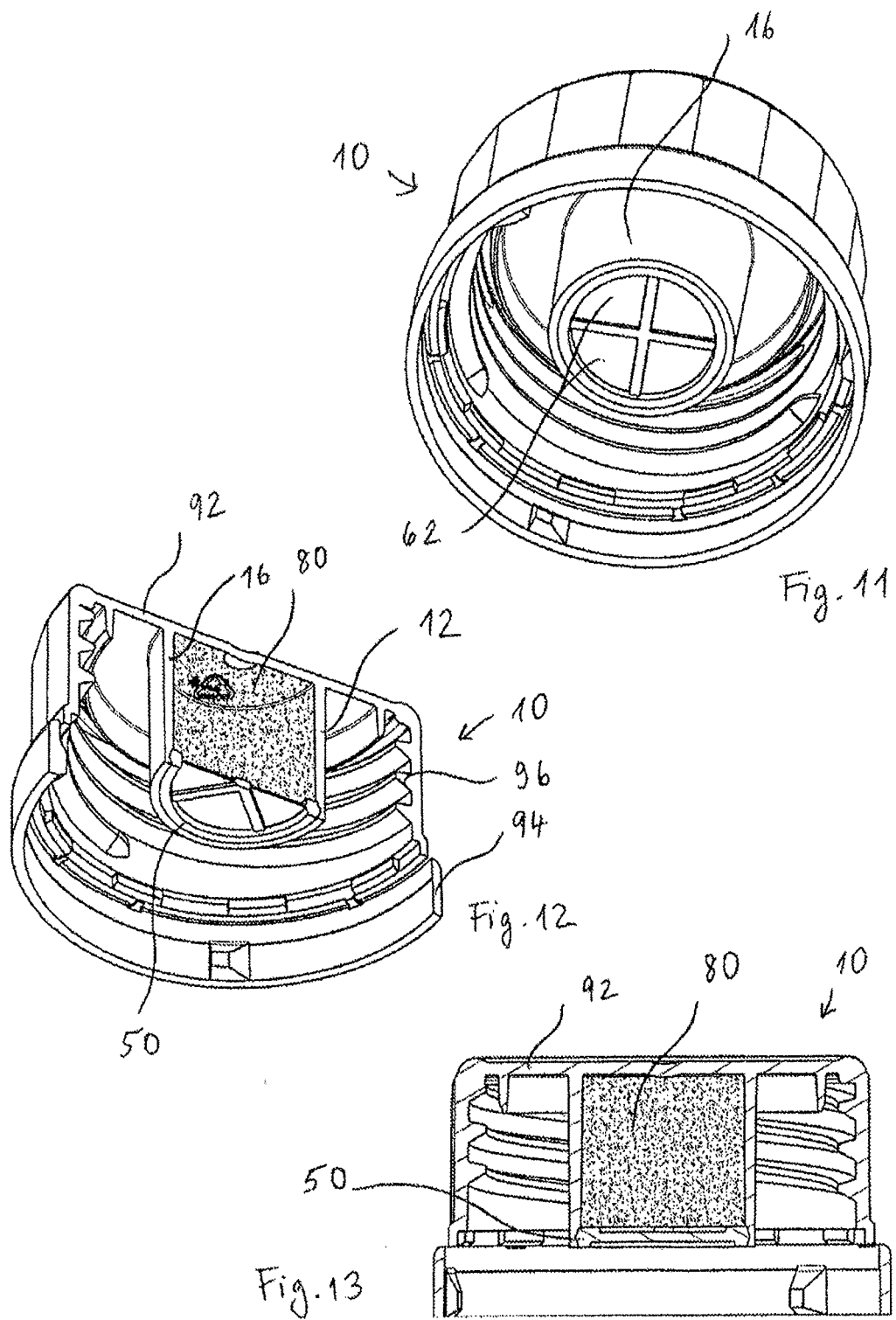

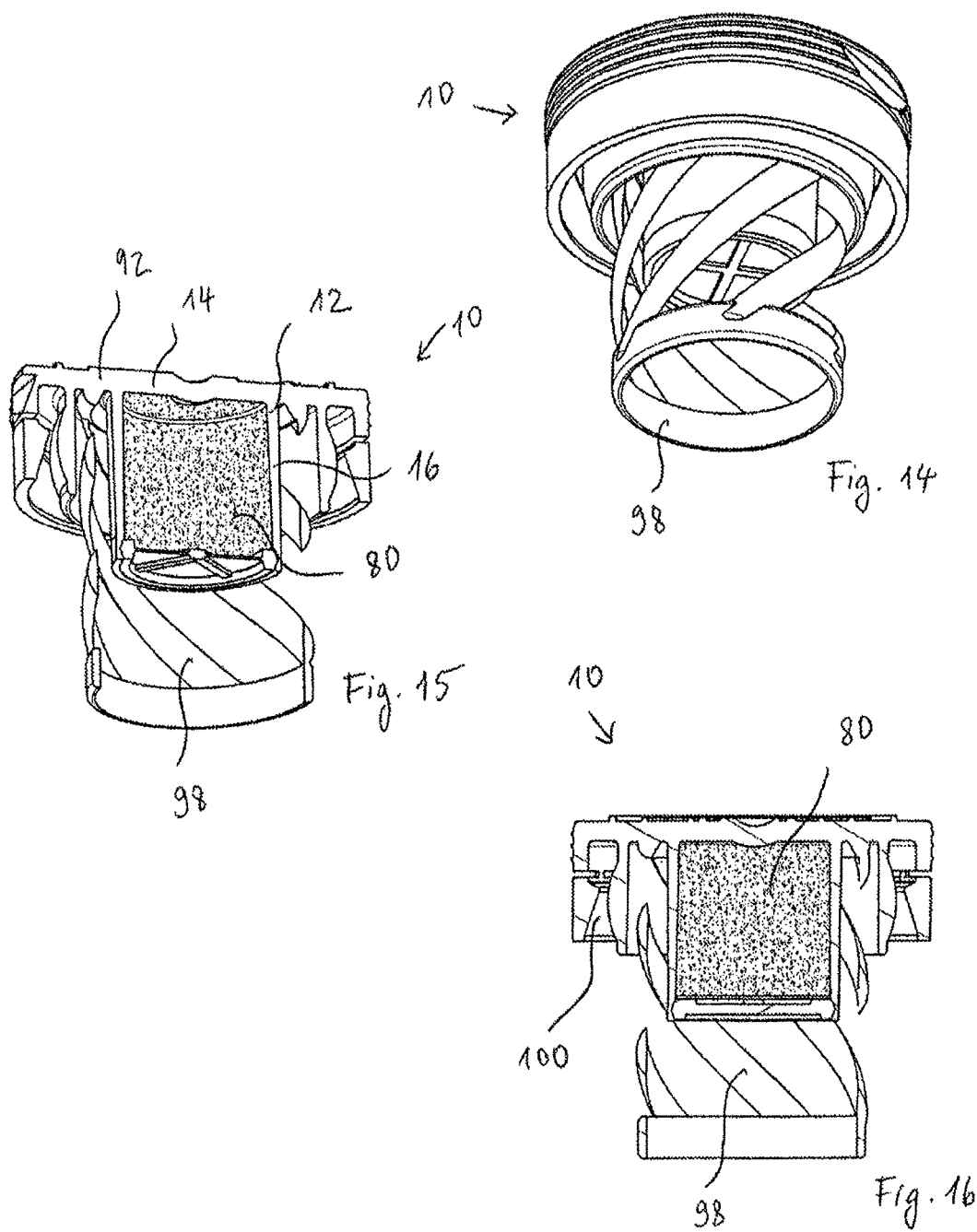

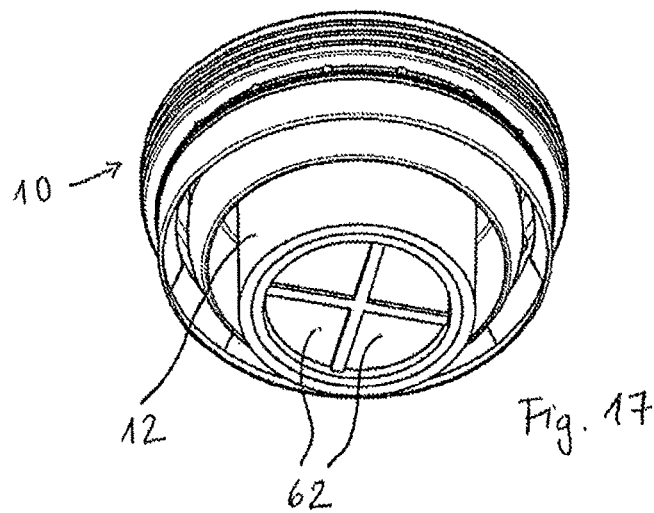
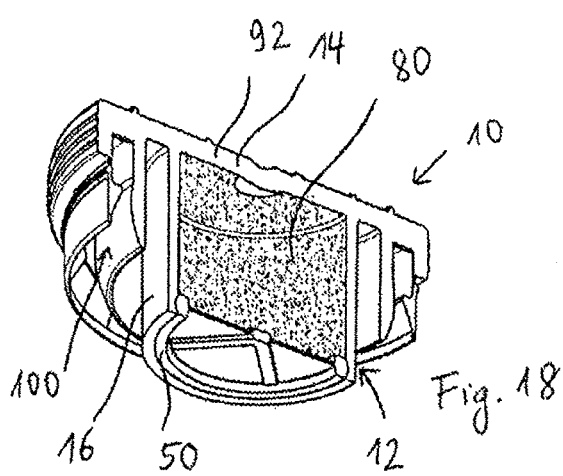
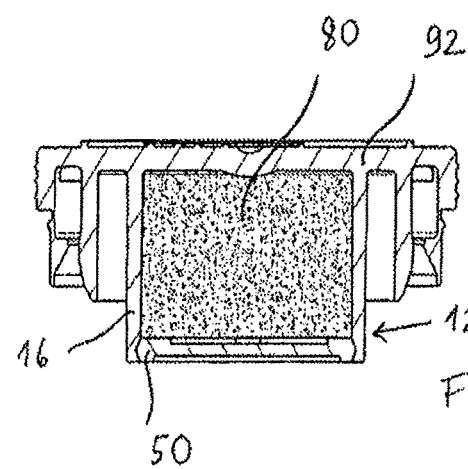

CANISTER FOR CONTAINING AN ACTIVE MATERIAL

FIELD OF THE INVENTION

The invention relates to a canister for containing an active material, like a desiccant or another functional material.

BACKGROUND OF THE INVENTION

A number of small desiccant canisters have been disclosed, which are formed from gas and liquid impermeable body portions onto which are secured one or more perforated end caps. These canisters generally contain a desiccant material which adsorbs moisture from the air as the air flows through the perforations provided in an end cap of the desiccant canister.

A common structure of such canisters is a one piece plastic body containing a cylindrical outer wall and a circular bottom wall, onto which is secured a cap containing a cylindrical outer wall and a circular top wall. The desiccant canister as disclosed in U.S. Pat. No. 5,759,241 utilizes a locking rib on the outer circumferential wall of the canister body which interacts with the cap to form a mechanical connection.

Mechanically assembled containers are sometimes problematic in that the mechanical connection between the canister body and the cap might not be strong enough to withhold a deformation of the canister under load conditions. Such load conditions might occur during use in a container filled with particulate matter or under exceptional circumstances, e.g. when the container is inadvertently dropped onto a hard surface. Load conditions leading to a deformation of the canister might also occur during the distribution of the canister in an automatic conditioning device. The resulting undesired opening of the container upon deformation has the consequence that its contents, e.g. dehydrating agents or oxygen adsorbents, might be introduced into the interior of the container and might contaminate goods contained therein, like drugs.

In order to solve this problem, it has been suggested to reinforce the stiffness of caps, e.g. by the provision of ribs. However, such solution can make it necessary or at least advisable to mount the cap to the canister body in a specific orientation, with a defined side of the cap oriented to the outside of the closed canister.

A different way to manufacture canisters is the assembly by means of the application of heat. When using a heat treatment, welding techniques have been previously suggested. An example of such a canister is disclosed in U.S. Pat. No. 5,824,140 describing a canister with an elongated hollow plastic body with two caps, which are fused to the ends of this plastic body. Specifically, it is suggested to use a manufacturing method including the steps of applying pressure and vibratory welding energy to the cap to form a fusion bond. However, the welding or any other comparable heat treatment to a porous membrane might be problematic because the membrane might be more sensitive to heat than the canister body. Accordingly, a heat treatment of a porous membrane might negatively influence its density, i.e. its permeability, and its behavior at the welded seams due to the degradation of the material of the membrane under an excessive thermal load.

As a further disadvantage, the functional material inside the canister might also be negatively affected by elevated temperatures so that a heat treatment is not feasible under certain circumstances. For example, gas uptake kinetic of chemical adsorbent may be catalyzed by heat. Further, heat exposure of adsorbents usually results in a loss of capacity.

A mechanical assembly followed by a welding of the contact region between the canister body and the cap involves a further manufacturing step and increases the production costs.

Finally, the use of perforated or micro-porous membranes results in a gas exchange kinetic which is nearly the same as the properties of the active material without the surrounding canister. In some instances, however, it is desirable to adjust the gas exchange kinetic.

A further disadvantage of perforated membranes is that powder active materials can contain particles or pieces of particles small enough to pass through the perforations, leading to a contamination of the content of the container in which the canister is introduced.

SUMMARY OF THE INVENTION

It is the object of the invention to suggest a canister which can be easily manufactured and assembled and provides for a high flexibility as regards its functionality. This object is solved by a canister for containing an active material with the features of claim 1. Preferred embodiments follow from the dependent claims.

The inventive canister for containing an active material, like an oxygen scavenger, a desiccant or another functional material, comprises a canister body, preferably of a cylindrical shape, comprising a bottom wall and at least one sidewall with inner and outer sidewall surfaces and an upper rim, wherein the at least one sidewall extends from the bottom wall. The canister further comprises a closing element comprising a top wall with an outer surface and an inner surface, and a fixing portion surrounding the top wall. The top wall and/or bottom wall and/or at least one of the at least one sidewall comprises at least one membrane region with a predetermined permeability to a defined gaseous substance, the membrane region being substantially unperforated. The fixing portion comprises an elevated or recessed snap portion around its outer periphery which is shaped corresponding to a mating geometry around the inner sidewall surface of the sidewall of the canister body so as to form a snap connection with the canister body. The closing element is fixed to the canister body in such a way that the outer surface of the top wall does not extend beyond the upper rim of the sidewall. The terms "elevated" or "recessed" intend to cover all possible shapes of the snap portions including projections and protuberances as well as a recess of any suitable shape. The predetermined permeability can be selected differently for e.g. the top wall and the bottom wall, in order to create specific gas exchange kinetics.

Since, in the assembled state, the closing element does not extend beyond the upper rim of the sidewall and is preferably essentially flush with the upper rim of the sidewall of the canister body, there is no salient portion which could become subject to a mechanical load. This gives an increased safety that the canister once assembled will not open again or could form a leak. In fact, in absence of any salient portion of the closing element, the canister can only be opened again with specific tools.

A further advantage of the canister according to the invention is the use of at least one membrane region which is substantially unperforated. This allows for adjusting, and especially slowing down where required, the gas exchange kinetic such as to be slow enough to avoid loss of capacity of the absorbents contained in the canister during processing steps of the canister. In other words, after the fabrication of the canister, it has to be stored, fed to and inserted into a container which then is filled with a specific product before the container is finally closed. A typical example of such a process is a usual drug filling line. During this period of time, the canister is subject to the ambient atmosphere and can already adsorb a specific component to become trapped, like oxygen or moisture. This results in a loss of the remaining capacity of the canister once the container has been closed after the filling in of the product in the container.

At the same time, the use of membrane regions allows to tailor the gas exchange kinetic to be quick enough to achieve a gas exchange by absorption or desorption at a rate as required to efficiently manage the head space requirement within the closed container for drug protection purposes. The gas exchange kinetic into the interior of the canister can be adjusted by an appropriate selection of the material of the canister and especially of the membrane regions, and the surface area and the thickness of the at least one membrane region in order to reach a predetermined permeability which, together with the surface area of the gas exchange surface, is the main factor of the gas exchange kinetic.

All the above-discussed features increase the level of flexibility of the inventive canister which can be easily produced.

The preferred provision of a cylindrical canister body generates a rotationally symmetric shape. This has the advantage that no specific orientation of the canister body relative to the closing element is required which simplifies the assembly of the canister. Conversely, in cases in which a specific orientation is required, this increases the complexity of the process because the individual components need to be aligned in a specific mutual orientation before the closing element can be put onto the canister body.

According to a preferred embodiment, the snap portion of the closing element comprises an elevated portion, preferably an elevated edge between beveled side flanks. The provision of an elevated edge between beveled side flanks leads to a geometry in which a tip extends into and abuts a wall section of a peripheral groove formed in the inner sidewall surface of the canister body. Such abutment creates a leak-tight seal between the canister body and the closing element.

According to a preferred embodiment, the inner sidewall surface is provided with a peripheral groove close to the upper rim. This establishes the cooperating and mating surface geometry in order to interact with an elevated portion at the outer circumference of the fixing portion of the closing element.

Preferably, the canister body is of a cylindrical shape and the top wall comprises reinforcing ribs extending in a radial direction, preferably having the geometry of a cross. The provision of reinforcing ribs serves to provide a sufficient stiffness to the closing element and to maximize the surface area of the membrane regions between the reinforcing ribs. The provision of reinforcing ribs in the shape of a cross provides the minimum number of ribs in order to efficiently stiffen out the closing element.

Preferably, the thickness of the reinforcing ribs is between 0.8 mm and 1.5 mm. The thickness is measured in a vertical direction when the canister is standing with its bottom wall on a horizontal surface. In contrast to this, the thickness of the membrane is preferably between 0.1 mm and 0.6 mm and more preferably about 0.25 mm. Depending on the permeable material as selected, such thickness provides for the desired permeability of the at least one membrane region.

According to a preferred embodiment, the canister body is of a cylindrical shape and the bottom wall is provided with a plurality of radially arranged spokes, preferably arranged at the inner side of the bottom wall. The arrangement of the spokes at the inner side of the bottom wall has the advantage that they can be connected to the inner sidewall surfaces of the sidewall of the canister body. Preferably, the spokes connect a central hub portion to the inner sidewall surfaces of the sidewall. The provision of the spokes at the bottom wall serves to reinforce the bottom wall and makes it possible also to provide the bottom wall with thin-walled membrane regions.

Preferably, the thickness of the spokes is between 0.6 mm and 1.5 mm. The thickness is measured in a vertical direction when the canister is standing with its bottom wall on a horizontal surface.

Preferably, the canister is filled with an active material able to trap and/or release a desired substance, preferably moisture, oxygen or perfume. Examples of such materials are granular or non-granular gas-treating material such as activated charcoal, molecular sieve, activated bentonite, calcium sulfide or crystalline metal aluminosilicates. Further, the canister could also contain any other suitable, conventional oxygen absorbing composition or conventional carbon dioxide absorbing composition. The canister can also be filled with a blend of active materials, e.g. a blend of moisture adsorbing material and an oxygen adsorbing material. On the other hand, it is also possible that the canister contains an active substance which produces vapors which pass into the environment inside the container in which the canister is located. Such vapors could be fragrances, carbon dioxide or moisture in order to control the relative humidity in the container.

Preferably, the material used for the closing element is different to the material of the canister body. Unlike prior art as discussed in the introductory part of the description using a welding technique to bond the closure element to the canister body, the mechanical connection according to the invention allows the use of different materials which can be tailored to a desired gas exchange kinetic and/or can be selected in view of a desired tight seal between the closure element and the canister body. When using different materials for the closing element and the canister body, it becomes possible to obtain a canister combining different trapping and/or releasing properties. For example, with an active material that absorbs both moisture and oxygen, or with a blend of active materials adsorbing moisture and oxygen, the closure element can be made of a material with a specific permeability to oxygen, whereas the canister body is made of a material with a specific permeability to moisture.

Preferably, the material of the canister body has a higher resilience than the material of the closure element. In such a way, a very efficient snap in connection can be established between a container body with a peripheral groove along its inner sidewall surface and a closure element with a peripheral rib at its fixing portion.

According to a preferred embodiment of the invention, the closure element is axially symmetric with regard to the median plane of the at least one membrane region. Such symmetry has the advantage that the closure element can be assembled onto the canister body no matter which main surface is facing outwards of the canister. There is no need to provide for a specific orientation of the closure element because it is both rotationally symmetric and axially symmetric. This simplifies the assembly of the canister and reduces its production effort and costs.

According to another embodiment, the canister according to the invention is integrated in a lid or cap of a container.

The canister body and the closing element can be produced by any manufacturing method, for example by injection moulding or by material compression.

According to another embodiment, the bottom wall of the canister body is integrally formed with a top wall of the lid or cap.

BRIEF DESCRIPTION OF THE DRAWINGS

In the following drawings, a specific embodiment of the invention will be described in more detail. In the drawings.

FIG. 5 is a view on the top surface of the closing element;

FIG. 6 is a view on the inner surface of the closing element, which, in the assembled state, faces the inside of the canister;

FIG. 7 is a cross-sectional view along line A-A in FIG. 5;

FIG. 8 is a three-dimensional view of a canister according to another embodiment of the invention;

FIG. 9 is a three-dimensional sectional view of the canister according to FIG. 8;

FIG. 10 is a sectional view of the canister according to FIG. 8;

FIG. 11 is a three-dimensional view of another embodiment of a lid of a container with an integrated canister according to the invention;

FIG. 12 is a three-dimensional sectional view of the lid according to FIG. 11;

FIG. 13 is a sectional view of the lid according to FIG. 11;

FIG. 14 is a three-dimensional view of another embodiment of a lid of a container incorporating the inventive canister;

FIG. 15 is a three-dimensional sectional view of the lid according to FIG. 14;

FIG. 16 is a sectional view of the lid according to FIG. 14;

FIG. 17 is three-dimensional view of another embodiment of a lid of a container incorporating the inventive canister;

FIG. 18 is a three-dimensional sectional view of the lid according to FIG. 18; and FIG. 19 is a sectional view of the lid according to FIG. 17.

DESCRIPTION OF PREFERRED EMBODIMENTS

Figure 1:
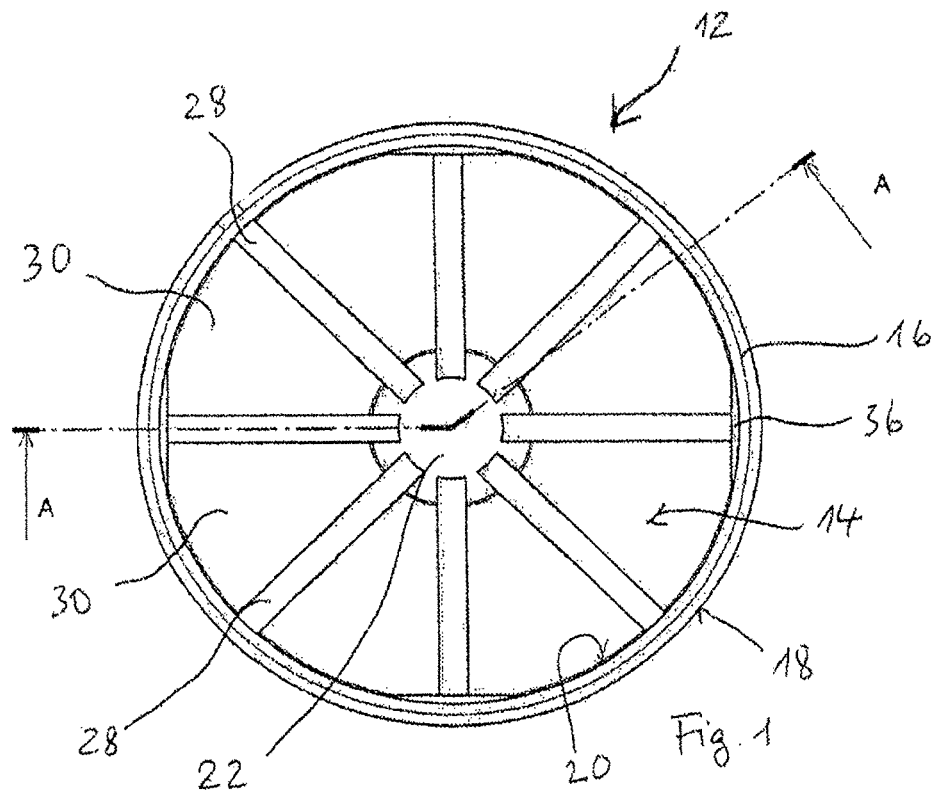
FIG. 1 shows a view into the inside of the canister body.

In the following description, the same elements will be denoted by the same reference numerals throughout the drawings.

Figure 2:
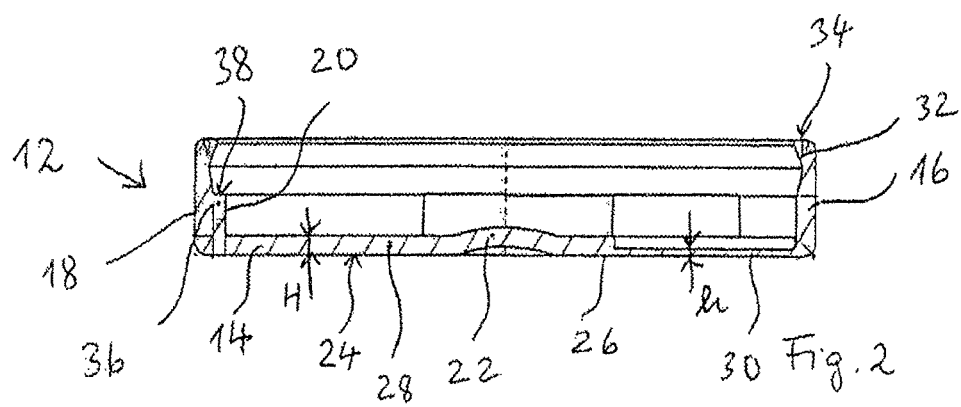
FIG. 2 is a sectional view along line A-A in FIG. 1.

FIG. 1 shows the cylindrical canister body 12. There are a bottom wall 14 as well as a cylindrical sidewall 16 which extends upwardly from the bottom wall 14 of the canister body 12. In this respect, reference is also made to FIG. 2 showing a cross-sectional view of the canister body along the sectional line A-A in FIG. 1.

The sidewall 16 has an outer sidewall surface 18 as well as an inner sidewall surface 20. The bottom wall 14 is provided with a hub portion 22 which, as can be best seen in FIG. 2, is elevated over the plane 24 of the bottom surface 26.

The bottom wall 14 is provided with a plurality of spokes 28 which are oriented in a radial direction and start from the hub portion 22 and extend up to and are integral with the sidewall 16. The spokes 28 act as reinforcing ribs and have a thickness which is much higher than that of the membrane regions 30 between an adjacent pair of spokes 28. As a non-limiting example, the spokes can have a height H of 0.7 mm, whereas the height h of the membrane region 30 is 0.25 mm.

The sidewall 16 extending upwards from the bottom wall is provided with a snapping geometry comprising a groove 32 which is close to the upper rim 34 of the sidewall 16 and runs in a circumferential direction starting from the inner sidewall surface 20.

As a further optional feature, the canister body 12 can be provided with reinforcing segments 36 which extend in an upwards direction up to the groove 32 and form a step portion 38 which determines the correct insertion position of the closing element as described with reference to FIGS. 5 to 7.

Figure 3:
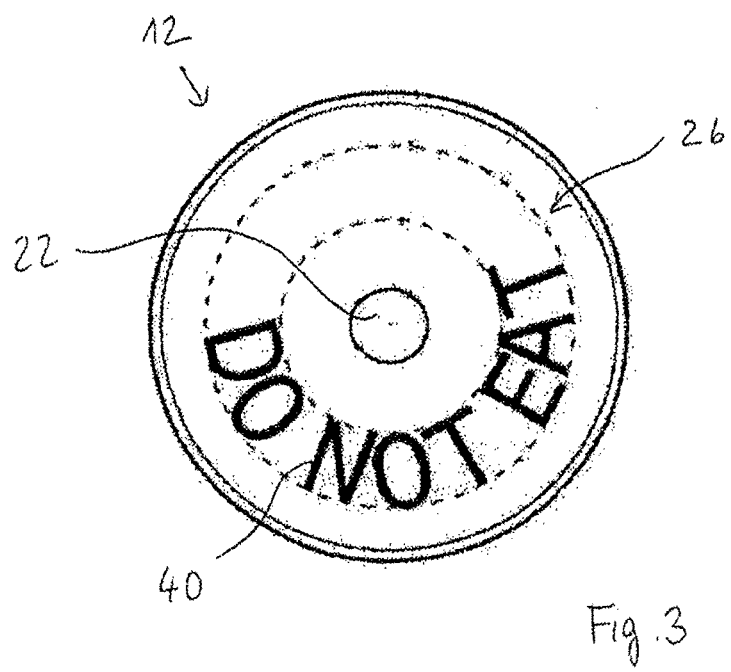
FIG. 3 is a view on the outer surface of the bottom wall of the canister body.

FIG. 3 is a view onto the bottom surface 26 of the canister body 12 which, except for the hub portion 22, can be essentially flat in order to increase the visibility of a gravure 40 which can optionally be provided on the bottom of the canister. Such gravure 40 can either specify the specific type of canister, its active material inside or, as in the example as shown in FIG. 3, include a warning to the user.

The closing element 50 of the canister is depicted in FIGS. 5 to 7. It consists of a top wall 52 with an outer surface 54 and an inner surface 56. The top wall 52 is surrounded by a fixing portion 58 being a circular ring which, around its outer periphery, is provided with a snap geometry 60 which will be described in more detail below.

The top wall 52 includes membrane portions 62 and reinforcing ribs 64 which, in the example as shown in FIGS. 5 to 7, are arranged in the shape of a cross. In the inner surface 56 of the top wall 52 as shown in FIG. 6, the reinforcing ribs 64 might be connected to the ring-shaped fixing portion 58 through reinforcing regions 66 which serve to ensure a uniform introduction of the forces from the fixing portion 58 into the reinforcing ribs 64. In the example as given in the embodiment of FIGS. 5 to 7, the thickness of the reinforcing ribs 64 can be selected to be T=1 mm, whereas the thickness of the membrane t is around 0.25 mm. This can be seen from the cross-sectional view along the line A-A in FIG. 5 which is shown in FIG. 7. The overall height H of the closing element 50 can be H=2 mm and, as can be seen from the cross-section view in FIG. 7, the membrane regions 62 are extending in the median plane in the direction of the thickness H of the closing element 50.

The snapping geometry as shown in FIG. 7 consists of two beveled surfaces 68 which are angled relative to each other and form a circumferential tip 70 in the median plane of the closing element. The angle α between the two adjacent beveled surfaces 68 at the tip 70 can be about 140°.

As can be seen in FIG. 7, the snap geometry 60 around the outer circumference of the closing element 50 is symmetrical with regard to the median plane of the closing element. As a result of this, the outer surface 54 and the inner surface 56 can be arbitrarily selected which simplifies the assembly of the container. No specific orientation of the circular closing element 50 relative to the canister body 12 is required.

Figure 4:
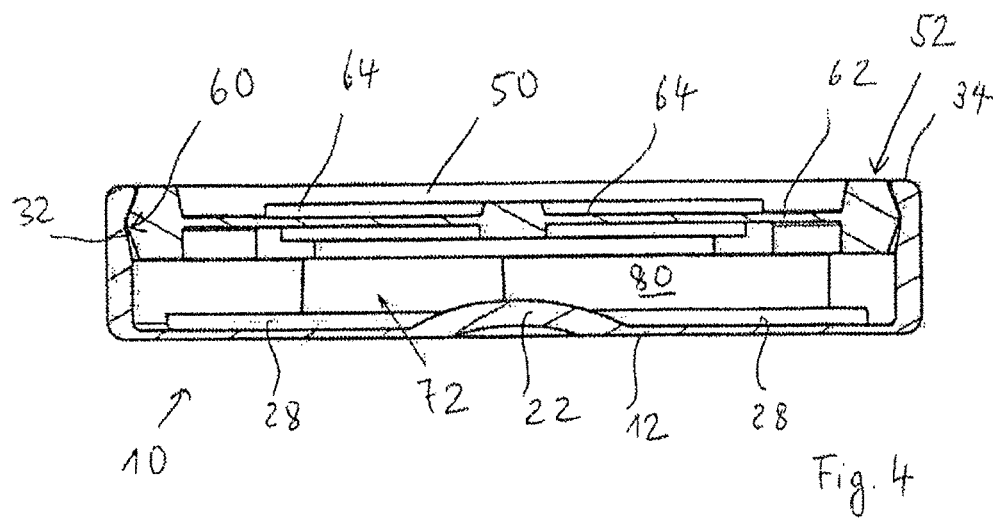
FIG. 4 is a cross-sectional view of an inventive canister.

The canister 10 as assembled is shown in FIG. 4. It forms an interior space 72 which is filled with an active material 80. As can be further seen, the snap geometry 60 at the outer circumference of the closing element 50 is received in the groove 32 of the canister body 12. In this way, a snap connection is formed between the canister body 12 and the closing element 50.

FIGS. 8 to 10 show a further embodiment of the inventive canister in a full view (FIG. 8), in a three dimensional view of one half of the canister (FIG. 9) and in a cross-sectional view (FIG. 10).

The canister according to FIGS. 8 to 10 is provided with membrane portions 62 in its closing element as well as membrane regions 30 in its bottom wall 14. Further, there are membrane sections 42 in the sidewall 16 also allowing improved gas exchange to the active material 80 received in the canister body 12.

To this end, the sidewall is provided with longitudinal support sections 44 alternating with membrane sections 42. In the cross-sectional view of FIG. 10, the relative thickness of the membrane sections 42 and the longitudinal support section 44 can be seen. From the cross-sectional view of FIG. 10, it can be seen that the membrane sections 42 at the sidewall 16 are integrally formed with the membrane regions 30 at the bottom surface. In order to provide an appropriate mechanical stability of the canister, the bottom surface is provided with a hub portion 22 and spokes 28 as described above for the previous embodiments. Comparing the cross-sectional views of FIG. 10 and FIG. 2, it can also be seen that the dimensions of the canister body 12 and the volume to be filled with active material can widely vary depending on the specific needs. In comparison to the previous embodiments described above, the embodiment of the inventive canister body as shown in FIGS. 8 to 10 does not only have an increased interior volume for receiving active material 80, but also an increased surface provided with thin-walled membranes in order to provide a quick gas exchange kinetic.

FIGS. 11 to 13, FIGS. 14 to 16, and FIGS. 17 to 19, respectively, show three lids of a container integrating an inventive canister.

In the embodiment as shown in FIGS. 11 to 13, a lid 10 of a container is shown, whereas FIG. 11 is a three-dimensional view, FIG. 12 is a three-dimensional sectional view and FIG. 13 is a cross-sectional view. As can be seen in FIGS. 11 to 13, the canister body 12 filled with an active material 80 is integrally formed with the top wall 92 of the lid of the container. Such integral structure can easily be realized because, after manufacturing the lid 10 including the wall structure of the canister body 12, the active material 80 is filled into the interior space of the canister body followed by the attachment of the closing element 50.

In the embodiment as shown in FIGS. 11 to 19, a geometry of the canister body with membrane portions in the closing element 50 only is described. However, it is also possible to provide the sidewalls with membrane sections as shown in FIG. 8.

As an aside, the lid 10 of the container can be provided in any suitable way as known in the art. In the example as shown throughout the FIGS. 11 to 19, the lid is provided with a tamper evident ring 94 as well as an inner thread 96 cooperating with a mating outer circumferential thread on a container body (not shown in FIGS. 11 to 19).

The embodiment as shown in FIGS. 14 to 16 is a different embodiment of a lid 10 of a container including the integral provision of the canister body 12, i.e. the bottom wall 14 of the container is integrally formed with the top wall 92 of the lid 10 of the container. The lid as shown in FIGS. 14 to 16 is the same as that shown in FIGS. 11 to 13. The lid 10 as shown in FIGS. 14 to 16 differs in that it is provided with a flexible compensating element 98 which serves to hold back products contained in the container, like tablets. Further, the lid differs from that as shown in FIGS. 11 to 13 in that it is not screwed on top of a container body, but clamped onto the upper rim of a container body. To this end, a receiving groove 100 is formed which serves to receive and firmly hold the upper rim of a container body so that the lid of the container will not inadvertently pop off the container.

The compensating element 98 restricts access to the canister body. Therefore, the specific shape of the lid 10 as shown in FIGS. 14 to 16 can be advantageously used together with the inventive canister, because after manufacturing of the lid with the integral bottom and sidewall of the canister and after filling in of the active material 80, the closing element 50 can be easily mounted to the canister body 12.

The embodiment of FIGS. 17 to 19 is very similar to that as shown in FIGS. 14 to 16 except for the omission of a compensating element. Also in this embodiment, the bottom wall 14 of the canister body 12 is integrally formed with the top wall 92 of the lid 10 of the container. The difference between the embodiment according to FIGS. 14 to 16 lies mainly in the absence of a compensating element as shown with reference numeral 98 in the embodiment according to FIGS. 14 to 17.

The membrane regions are unperforated which results in a slower gas exchange rate. To the contrary, perforated membranes nearly have the same gas exchange as the active material itself without any surrounding barrier. Therefore, by the provision of an unperforated membrane, the gas exchange kinetic can be adjusted and slowed down where this is required. A further advantage of the unperforated membrane regions is the suitability of the canister to the filled with a powder, avoiding leakage of very fine particles that could pass through the perforations.

Besides the surface area and the thickness of the membrane regions, the material of the membrane can be selected in order to influence the desired permeability to a specific gas component and its exchange kinetic. Since the canister body and the closing element are injection molded and form unitary pieces, the materials of the canister body and the closing element can be selected according to the behavior of the membrane regions.

Suitable materials are permeable polymers such as for example: polyolefin based polymer, for example polyethylene, HDPE, LOPE, polypropylene (PP), polystyrene (PS), polyvinyl chloride (PVC), ethylene vinyl acetate (EVA), ethylene vinyl acetate copolymer (EVOH), cyclic olefin copolymer (COC); polyester based polymers for example polycaprolactone (PCL), polylactic acid (PLA), polyethylene terephthalate (PET), polybutylene terephthalate (PBT), etc.; polycarbonate (PC), polyoxymethylene (POM), polyamide, polyethylene sulfide (PPS), BOPP or cellulose.

When the active material absorbs oxygen, preferable materials have an Oxygen Transmission Rate of at least 100 $cm^3 \cdot 100$ $\mu m/m^2 \cdot day \cdot bar$ at a temperature of 23° C. (ASTM D3985), preferably at least 500 $cm^3 \cdot 100$ $\mu m/m^2 \cdot day \cdot bar$.

When the active material absorbs or releases moisture, preferred materials have a water permeability of at least 1 $g \cdot 100$ $\mu m/m^2 \cdot day \cdot bar$ at a temperature of 23° C. and a relative humidity of 85%, preferably at least 4 $g \cdot 100$ $\mu m/m^2 \cdot day \cdot bar$, more preferably at least 10 $g \cdot 100$ $\mu m/m^2 \cdot day \cdot bar$.

The material used for the closing element can be different from that used for the canister body. For example, the material used for the canister body can be more resilient than the material of the closing element which facilitates the assembly of the two parts by the snap connection between the closing element and the canister body.

As can be seen from FIG. 4, the closing element 50 is integrally included in the canister body and has an outer diameter which is smaller than the outer diameter of the canister body. In such a way, it is possible to position the closing element such that its top wall 52 is flush with the upper rim 34 of the canister body 12. In such a way, the overall height of the canister 10 can be made very small. The total height of the canister including the closing element 50 can be less than 2.5 mm. A further advantage is the difficulty to remove the closing element 50 from a canister once it has been closed.

The invention claimed is:

1. A canister for containing an active material, like an oxygen scavenger, a desiccant or another functional material, comprising
    a canister body comprising a bottom wall and at least one sidewall with inner and outer sidewall surfaces and an upper rim, wherein the at least one sidewall extends from the bottom wall; and
    a closing element comprising a top wall with an outer surface and an inner surface, and a fixing portion surrounding the top wall; wherein
    the top wall and/or the bottom wall and/or at least one of the at least one sidewall of the canister body comprises at least one membrane region with a predetermined permeability to a defined gaseous substance, wherein the membrane region is substantially unperforated; and wherein the membrane region is integrally formed with the top wall and/or the bottom wall and/or at least one sidewall of the canister body; and
    wherein the fixing portion comprises an elevated or recessed snap portion around its outer periphery which is shaped corresponding to a mating geometry around the inner sidewall surface of the sidewall of the canister body so as to form a snap connection with the canister body; and wherein
    the closing element is fixed to the canister body in such a way that the outer surface of the top wall does not extend beyond the upper rim of the sidewall of the canister body.

2. The canister according to claim 1, wherein the snap portion of the closing element comprises an elevated portion thereof.

3. The canister according to claim 1, characterized in that the inner sidewall surface of the sidewall of the canister body comprises a peripheral groove close to the upper rim.

4. The canister according to claim 1, wherein the canister body is in a cylindrical shape; and the top wall of the closing element comprises reinforcing ribs extending in a radial direction.

5. The canister according to claim 4, wherein the thickness (T) of the reinforcing ribs is between 0.8 mm and 1.5 mm.

6. The canister according to claim 1, wherein the thickness (t) of the membrane region is between 0.1 mm and 0.6 mm.

7. The canister according to claim 1, wherein the canister body is in a cylindrical shape and the bottom wall of the canister body is provided with a plurality of radially arranged spokes arranged at an inner side of the bottom wall.

8. The canister according to claim 7, wherein the spokes connect a central hub portion to the inner sidewall surface of the sidewall.

9. The canister according to claim 1, wherein the canister is filled with an active material able to trap and/or release a desired substance selected from the group consisting of moisture, oxygen and a fragrance.

10. The canister according to claim 1, wherein a composition material of the closing element is different from a composition material of the canister body.

11. The canister according to claim 10, wherein the composition material of the canister body has a higher resilience than the composition material of the closure element.

12. The canister according to claim 1, wherein the fixing portion of the closure element is axially symmetric with regard to a median plane of the closure element.

13. The canister according to claim 1, wherein the canister body and the closing element are both injection molded.

14. The canister according to claim 1, wherein the canister body is integrated in a lid or cap of a container.

15. The canister according to claim 14, wherein the bottom wall of the canister body is integrally formed with a top wall of the lid or cap.

16. The canister according to claim 2, wherein the snap portion of the closing element comprises a beveled edge between beveled side flanks of the elevated portion.

17. The canister according to claim 4, wherein the reinforcing ribs extending in a radial direction have a geometry of a cross.

18. The canister according to claim 1, wherein the thickness (t) of the membrane is about 0.25 mm.

* * * * *